July 7, 1964  L. J. LITALIEN ETAL  3,140,166
GLASS MOLD HAVING TWO DETACHABLE INTERFITTED SECTIONS
Filed March 20, 1961
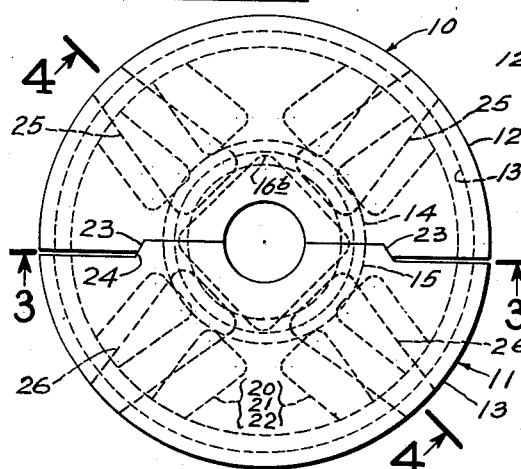
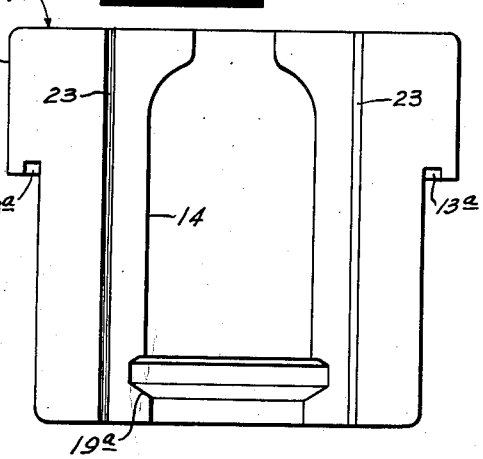
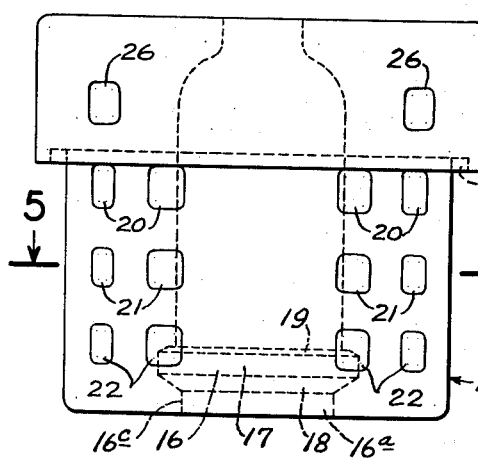
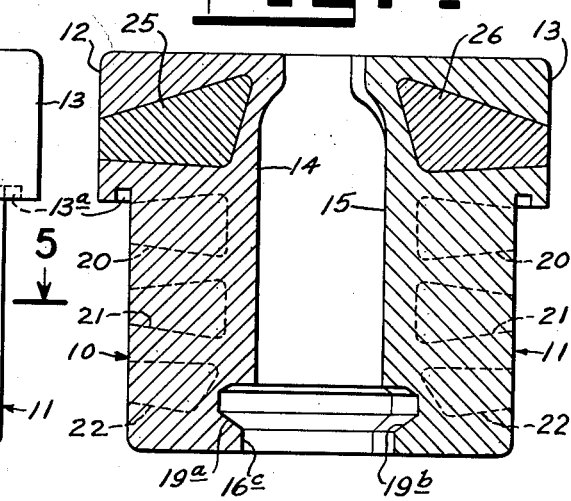
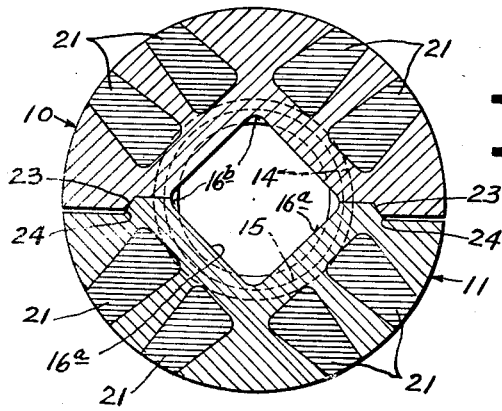
INVENTORS
LAWRENCE J. LITALIEN
JOSEPH DUTHAVECK
BY
H. G. Manning
ATTORNEY > United States Patent Office 3,140,166
Patented July 7, 1964

3,140,166
GLASS MOLD HAVING TWO DETACHABLE INTERFITTED SECTIONS
Lawrence J. Litalien, 18 Henry St., Waterbury, Conn., and Joseph Duthaveck, 173 George St., Hartford, Conn.
Filed Mar. 20, 1961, Ser. No. 96,839
1 Claim. (Cl. 65—356)

This invention relates to blank and blow molds for use in the manufacture of hollow glassware such as bottles, jars, tumblers, etc.

One object of the present invention is to provide a glass mold of the above nature which may be used in various types of glass making machines.

A further object is to provide a glass mold of the above nature in which the rate of heat transfer from the inside to the outside of said mold will be enhanced by the use of a plurality of metallic heat conducting lugs embedded in the walls of said mold.

A further object is to provide a mold of the above nature which is made of cast iron having high thermal conductivity, low thermal expansion, and high resistance to grain growth and scaling.

A further object is to provide a glass mold of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing:

FIG. 1 represents a top plan view of the improved glass mold in which the two separate parts thereof are shown interfitted in assembled position.

FIG. 2 is a side view in elevation of the same, showing in dotted lines the shape of the interior bottle cavity.

FIG. 3 is a side elevation of one of the separate halves of the two-part mold, taken from the line 3—3 of FIG. 1, looking in the direction of the arrows.

FIG. 4 is a cross-sectional view taken along the line 4—4 of FIG. 1.

FIG. 5 is a cross-sectional view of the assembled abutting mold sections, taken along the line 5—5 of FIG. 2, looking downwardly, and showing the shape of the lower heat conducting lugs.

Referring now to the drawing, in which like reference numerals denote corresponding parts throughout the several views, the numerals 10 and 11 indicate a pair of substantially semicylindrical mold body members preferably constructed from "ASMT" specification, grey cast iron. Such a type of cast iron is "open grain" and has large graphite flake distribution in conjunction with low heat expansivity and high thermal conductivity.

The mold body members 10 and 11 are provided with aligned semicircular upper enlarged flanges 12 and 13, below which are undercut locking grooves 13a. The mold body members 10 and 11 are provided with interior semicircular bottle cavities 14 and 15 which are adapted to shape the glass bottle during the molding process.

Provision is also made of a detachable solid cast iron bottom plug 16 having an upper annular flange 17 provided with beveled annular sections 19 and 18 at the top and bottom thereof. The flange 17 is adapted to fit snugly within complementary shaped recesses 19a and 19b located near the bottom of the body sections 10 and 11 respectively. The plug 16 has a square bottom section 16a having rounded corners 16b to fit corresponding recesses 16c in the base of the body members 10, 11.

In order to rapidly cool the molded bottle or other glassware after the molding has been completed, provision is made of three sets of rounded tapered copper cooling lugs 20, 21, 22, arranged in pairs in vertical aligned columns around the circumference of the lower section of the cast iron body members 10 and 11.

Provision is also made of a single set of four special upper enlarged rounded tapered radial lugs 25, 26, located within the flanged sections 12 and 13 of the mold body members 10 and 11 and substantially in vertical alignment with the pairs of lugs 20, 21, 22. The inner edges of the special enlarged lugs 25 and 26 are inclined upwardly and inwardly in a converging relation, in order to lie substantially parallel with the curved neck of the bottle being molded.

It will be understood from this construction that the high thermal conductivity of the copper lugs 20, 21, 22, 25, 26 will cause heat to be transferred rapidly and uniformly from the glass bottle being molded to the exterior of the mold for rapidly cooling said bottle.

In order to cause the mold sections to interfit snugly together and prevent leakage of molten glass during the molding operation, provision is made of a pair of interfitting Z-shaped joints 23, 24 as clearly shown in FIGS. 1 and 5 of the drawing.

Operation

In operation, the two body members 10 and 11 of the mold will be assembled in interfitted abutting relation as shown in FIGS. 1 and 5, and with the detachable square bottom plug 16 located between the lower sections of said body members.

It will be understood that after a glass "gob" has been partially blown in a "blank" mold (not shown), it will be inverted and transferred to the blow mold herein disclosed, with a partially blown cavity formed within the "gob," as clearly described in applicants' prior Patent 2,683,332, issued July 13, 1954, entitled "Glass Mold Having a Detachable Two-Part Insert," over which the present invention is an improvement.

The remainder of the glass blowing operation takes place within the cavity of the improved blow mold, resulting in an article of hollow glassware of uniform thickness and conforming closely with the shape of the interior of the cavities of the body members 10 and 11.

The advantages of the present invention are its simplicity, low cost, and the rapid efficient cooling of the molded glassware due to the use of the rows of copper tapered lugs embedded in the cast iron body sections, which lugs conduct the heat rapidly from the interior to the exterior of the mold.

It will be understood that the mold herein disclosed is not limited for use as a "blow" mold, but may be also employed as a "blanking" mold, a "parison" mold or in a "press and blow" mold, etc. within the spirit and scope of the present invention.

While there has been disclosed in this specification one form in which the invention may be embodied, it is to be understood that this form is shown for the purpose of illustration only and the invention is not limited to this specific disclosure but may be modified and embodied in various other equivalent forms without departing from its spirit.

In short, the invention includes all the modifications and embodiments coming within the scope of the following claim.

Having thus fully described the invention, what is claimed as new and for which it is desired to obtain Letters Patent is:

In a mold for making a hollow article of glassware, a pair of substantially cylindrical abutted metallic body members having interfitting grooves in their abutting faces, said body members having interior semicylindrical cavities shaped to produce the final configuration of the glassware blown in said mold, said body members having a plurality of pairs of outwardly extending tapered radial lugs of heat conductive material embedded therein, said lugs being flush with the outer surfaces of said body members and spaced from the inner surfaces thereof, said body members being provided with enlarged upper semicylindrical flanges within which are embedded a series of tapered radial cooling lugs larger in diameter than the remainder of said lugs, said pairs of lugs forming the sides of a polygonal figure, the lower edge of said flanges being undercut to form a circular locking groove.

References Cited in the file of this patent

UNITED STATES PATENTS

| | | |
|---|---|---|
| 1,875,202 | Aftergut | Aug. 30, 1932 |
| 2,336,822 | Wadman | Dec. 14, 1943 |
| 2,485,836 | MacConnell | Oct. 25, 1949 |
| 2,683,332 | Litalien et al. | July 13, 1954 |
| 2,757,485 | Fedevich | Aug. 7, 1956 |